J. M. KAHL.
AUTOMATIC RELEASE CLEVIS CONSTRUCTION.
APPLICATION FILED JUNE 2, 1919.
1,327,480.
Patented Jan. 6, 1920.
2 SHEETS—SHEET 2.
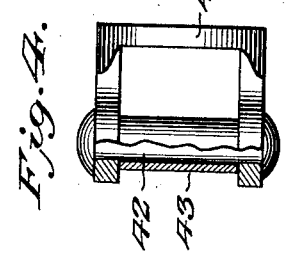
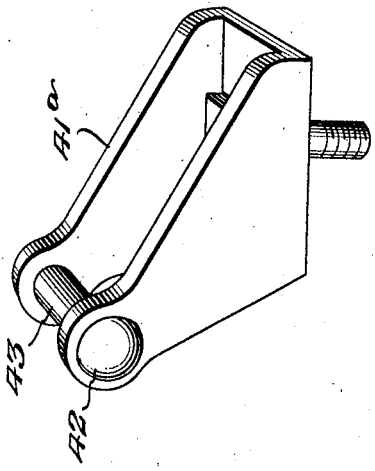
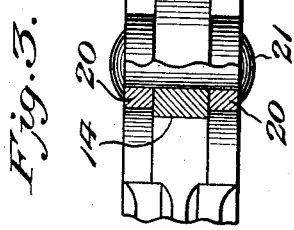
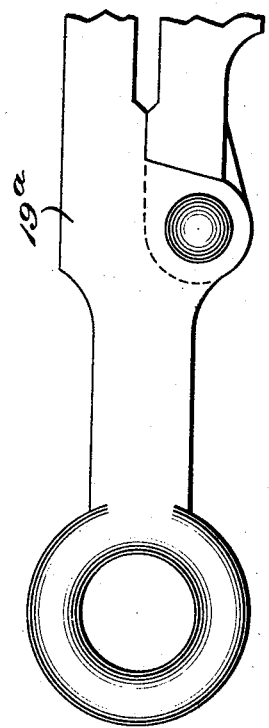
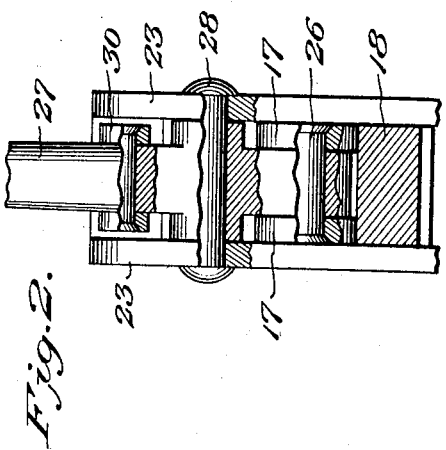
Witnesses
Edwin F. McKee
Inventor
John M. Kahl
By Victor J. Evans
Attorney

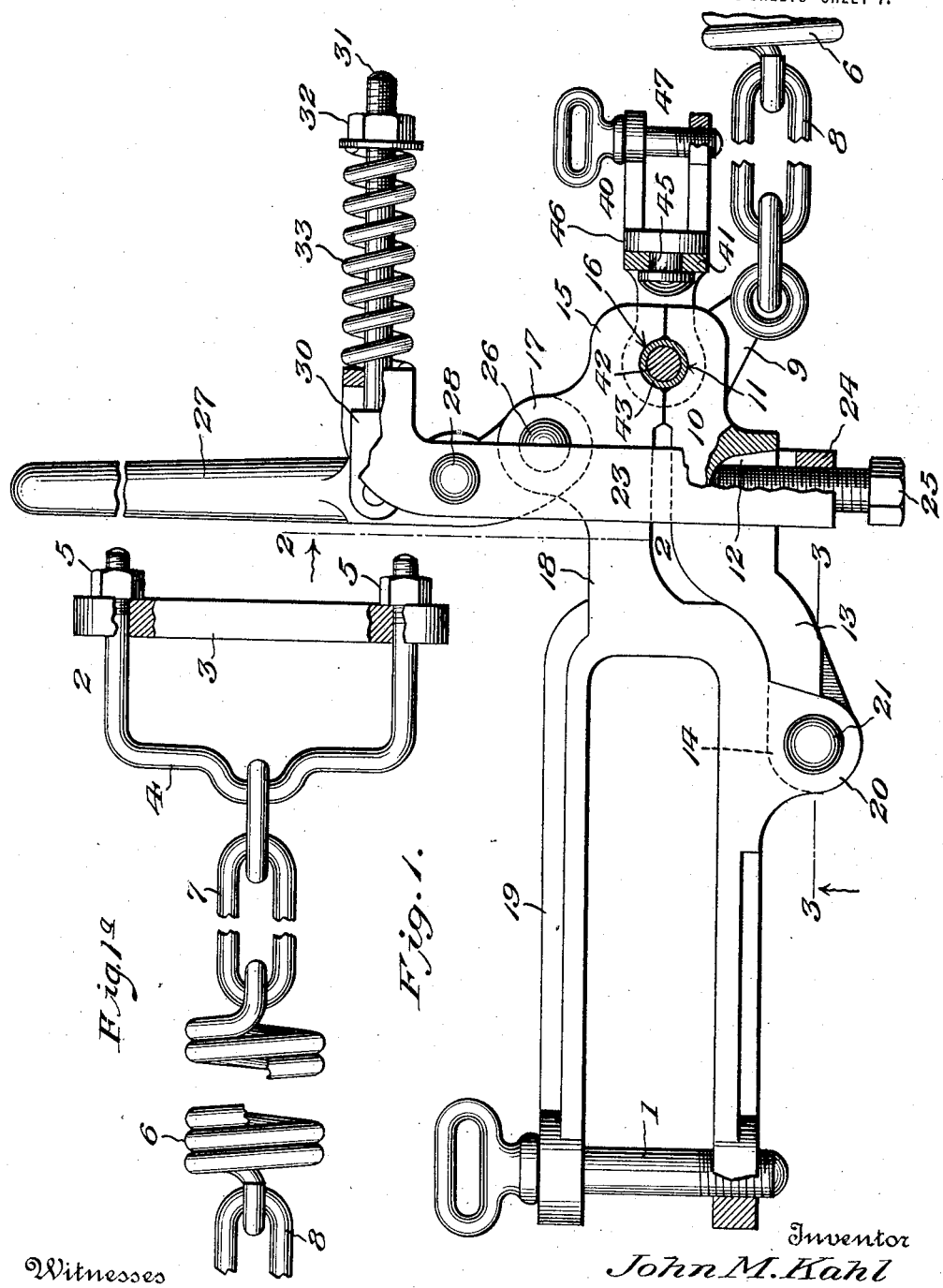

UNITED STATES PATENT OFFICE.

JOHN M. KAHL, OF HEATON, NORTH DAKOTA.

AUTOMATIC-RELEASE CLEVIS CONSTRUCTION.

1,327,480.  Specification of Letters Patent.  Patented Jan. 6, 1920.

Application filed June 2, 1919. Serial No. 301,248.

*To all whom it may concern:*

Be it known that I, JOHN M. KAHL, a citizen of the United States, residing at Heaton, in the county of Wells and State of North Dakota, have invented new and useful Improvements in Automatic-Release Clevis Constructions, of which the following is a specification.

The general object of my present invention is the provision of a clevis construction capable of being automatically detached when a plow or other implement comes in contact with obstructions such as would cause sufficient draft to break or strain the implement. The improved construction being adapted to prevent the breaking of eveners and the twisting of plow beams, as well as the imposition of undue strain on other implements when the same brings up against fixed obstructions in their paths, it follows that implements equipped with my improvement may be constructed of light weight which will bring about a material saving in manufacture and at the same time render the implements light of draft.

With the foregoing in mind, the novelty, utility and practical advantages of my invention will be fully understood from the following description and claims when the same are read in connection with the drawings, accompanying and forming part of this specification, in which:

Figure 1 is a view, partly in side elevation and partly in section showing a construction in accordance with my present invention.

Fig. 1ª is a broken view of a portion of the connection shown in part at the right of Fig. 1.

Fig. 2 is a partial section taken on the line 2—2 of Fig. 1, looking rearwardly.

Fig. 3 is a projected view, partly in inverted plan and partly in section, showing a detail.

Fig. 4 is a detail view partly in plan and partly in section, showing one member of the swivel connection.

Figs. 5 and 6 are detail views illustrative of modifications hereinafter referred to in detail.

Similar numerals designate corresponding parts in all figures of the drawings.

In the embodiment shown in Fig. 1, I prefer to employ a pin 1 for the connection of my improvement to a draft evener (not illustrated). I also prefer to employ the construction shown at the right of Fig. 1, in order to limit the forward movement of the evener and the release clevis when the latter is automatically detached from a plow or other implement. The clamp 2 comprised in the said construction may be attached to a plow beam or to any other appropriate part of a plow or other implement. The clamp 2 is preferably made up of a bar 3, and a bail 4, the arms of which are extended through apertures in the bar 3, and are threaded to receive nuts 5. In addition to the clamp 2, the connection alluded to includes a retractile spring 6, a chain section 7 interposed between said spring and the bail 4, and a chain section 8 at the opposite end of the spring and interposed between the same and an arm 9 on the lower jaw 10 of my novel release clevis. The said lower jaw 10 of the release clevis is provided in its upper side with a concave seat 11, and in its under side with a socket 12; and it is also provided with a forwardly and downwardly reaching arm 13, Figs. 1 and 3, the rear end portion 14 of which is reduced and transversely apertured, as clearly appears in Fig. 3. In combination with the lower jaw 10, I employ an upper jaw 15 with a concave seat 16 in its under side and registered with the seat 11. The said jaw 15 is provided with an upstanding bifurcated portion 17, Figs. 1 and 2, and is also provided with the forwardly extending arm 18 by which is carried the loop-shaped portion 19 in which the pin 1 is mounted and secured by a thread or other suitable means. On the lower side of the portion 19 are lugs 20 disposed at opposite sides of the portion 14 of the jaw 10 and pivotally connected therewith through the medium of a transverse pintle 21. The jaws 10 and 15 are yieldingly held together as shown in Fig. 1, by the means which will now be described. The said means comprises among other elements an elbow link 23 which as best shown in Figs. 1 and 2, has side arms and a lower cross-bar 24 in which is threaded a set screw 25 that bears in the socket 12 and is designed for use in regulating the tension of the lock. Pivoted at 26 to the jaw 15 at the upper side of the jaw is a lever 27, which lever is pivoted at 28 between the side arms of the elbow link 23, and extends, by preference, above the elbow link so that it may be manipulated manually when the same is necessary. Arranged between the upper portions of the side arms of the elbow link 23, as clearly shown in Figs. 1 and 2, is a bifurcated body 30, pivotally connected to and straddling the lever 27 and having a stem 31 that extends rearwardly beyond the rearwardly extending arm of the elbow link. The rear portion of said stem 31 is threaded to receive a nut 32, and mounted on the said stem 31 and interposed between the rearwardly directed arm of the elbow link 23 and the nut 32 or any other suitable abutment is a compression spring 33. The pintle that connects the bifurcated body 30 and the lever 27 has its end portions enlarged and countersunk in the sides of the body 30, as appears in Fig. 2. It will also be observed by reference to Fig. 2 that there is ample clearance between the sides of the body 30 and the inner sides of the side arms 23 of the elbow link. Manifestly when an extraordinary forward pull is exerted on the portion 19 of my improvement, the jaws 10 and 15 will be opened against the action of the spring 23 for the purpose of releasing the jaws from the swivel clevis 40. The said clevis 40 comprises a member 41, Figs. 1 and 4, a pintle or journal 42 carried by said member 41, and a bushing 43 rotatable about the pintle and adapted to be seated, as shown in Fig. 1, in the opposed seats 11 and 16. The rear transverse portion 44 of the member 41 is opposed to and pivotally connected at 45 with the forward transverse portion 46 of the clevis member 47, which latter is adapted to be attached to a plow or other implement. When the plow or other implement equipped with my improvement is stopped by a fixed obstruction, the jaws 10 and 15 are automatically separated from the clevis member 41, and in that way breakage and the imposition of undue strain are averted.

In Fig. 5 I show a modified portion 19ª which is preferably constructed as illustrated to adapt my improvement for tractor purposes or heavy draft machinery.

In the modification shown in Fig. 6, the pintle 42 and the bushing or roller 43 thereon are carried in a bifurcated body 41ª which is adapted to be fixed upon a ball, tongue or the like, with a view to attaching my novel automatic release clevis with the same.

I have specifically described the construction and relative arrangement of the parts in these preferred forms of my invention because such forms are the best practical embodiments of my ideas of which I am cognizant. It is to be understood, however, that in the future practice of my invention various changes in the forms and relative arrangement of parts may be made within the scope of my invention as defined by my appended claims.

Having described my invention, what I claim and desire to secure by Letters-Patent, is:

1. In means for the purpose described, jaws mounted to move toward and from each other and one jaw equipped for the connection of draft means, means yieldingly held by the jaws and adapted to be released when one jaw is moved away from the other, a lever pivoted to one jaw, a link pivoted to said lever, and engaged with the other jaw, means connected with the lever and equipped with an abutment, and a spring interposed between the link and said abutment.

2. In means for the purpose described, jaws mounted to move toward and from each other, and one jaw equipped for the connection of draft means, means yieldingly held by the jaws and adapted to be released when one jaw is moved away from the other, a lever pivoted to one jaw, a link pivoted to said lever, tension-regulating means carried by the link and bearing against the other jaw, means connected with the lever and equipped with an abutment, and a spring interposed between the link and said abutment.

3. In means for the purpose described, jaws mounted to move toward and from each other, and one jaw equipped for the connection of draft means, means yieldingly held by the jaws and adapted to be released when one jaw is moved away from the other, a lever pivoted to one jaw, a link pivoted to said lever, and having a rearwardly directed portion; said link being arranged in engagement with the other jaw, a body pivotally connected with the lever and having a stem extending rearwardly beyond the rearwardly directed portion of the link and equipped with a nut, and a spring mounted on said stem and interposed between the rearwardly directed portion of the link and the nut.

4. In means for the purpose described, jaws mounted to move toward and from each other and one jaw equipped for the connection of draft means, and the other jaw having a socket, means yieldingly held by the jaws and adapted to be released when one jaw is moved away from the other, a lever pivoted to one jaw, a link pivoted to said lever, a screw-bearing in said link and disposed in said socket, means connected with the lever and equipped with an abutment, and a spring interposed between the link and said abutment.

5. In means for the purpose described, a release clevis, means coöperating with the release clevis and from which the same is automatically disconnected when the draft is excessive, and a supplemental connection for limiting the movement of the release clevis subsequently to the disconnection thereof, said supplemental connection comprising a spring between chain sections, and means for connecting one chain section to an implement.

In testimony whereof I affix my signature.

JOHN M. KAHL.